Sept. 10, 1957 B. P. BAKER ET AL 2,806,111

CIRCUIT INTERRUPTERS

Filed April 26, 1954 5 Sheets-Sheet 2

CIRCUIT INTERRUPTERS

Filed April 26, 1954 5 Sheets-Sheet 4

Sept. 10, 1957  B. P. BAKER ET AL  2,806,111

CIRCUIT INTERRUPTERS

Filed April 26, 1954  5 Sheets-Sheet 5

2,806,111

CIRCUIT INTERRUPTERS

Benjamin P. Baker, Turtle Creek, and Winthrop M. Leeds, Pittsburgh, Pa., assignors to Westinghouse Electric Corporation, East Pittsburgh, Pa., a corporation of Pennsylvania Application April 26, 1954, Serial No. 425,626

19 Claims. (Cl. 200—150)

This invention relates to circuit interrupters in general, and, more particularly, to arc-extinguishing structures therefor.

A general object of our invention is to provide an improved circuit interrupter which will operate more effectively than those of the prior art.

A more specific object of our invention is to provide an improved and more effective circuit interrupter, which will be adaptable for operation over a wide current range.

A more detailed object of our invention is to provide an improved arc-extinguishing structure having one or more vent passages in which valve means is provided to control the venting of fluid out of said venting passages, so that during the interruption of relatively low values of current, the pressure within the arc-extinguishing structure may be somewhat conserved to facilitate such low-current interruption. During the interruption of high-value currents, because of the increased pressure, the valve means will be opened further to limit the amount of internal excess pressure within the arc-extinguishing structure.

This problem of providing a suitable high-speed interrupter has become particularly acute in present commercial practice, where tremendously wide current ranges are encountered, say, for a particular example, from a few amperes to 45,000 amperes. It is readily apparent that it is a difficult problem to obtain, for example, three cycle interrupting time, or less, at all currents throughout such a wide range with interrupters, particularly those of the high-voltage type, which may even approach the unprecedented voltage range of 330 kv. to 440 kv.

It is still a further object of our invention to provide interrupting units suitably valve controlled, which will render them pressure responsive in operation.

A more specific object of our invention is to provide one or more flexible metallic valve members, which may be provided to individually control one or more venting passages leading out of an arc-extinguishing unit.

Still a further object is to provide an improved arc-extinguishing unit comprising a plurality of contiguously disposed insulating plate members, in which valve means associated with the extinguishing unit may be readily provided by a suitable configuration of the insulating plate material itself, relying upon the inherent resiliency of the insulating plate material for valve control.

Yet a further object of our invention is to provide an improved arc-extinguishing assembly including a plurality of arc-extinguishing units associated with a casing, in which piston operation is obtained, whereby the inlet passages leading from the casing to the several arc-extinguishing units may be controlled by valve action to prevent gas and contaminated fluid from reversing its flow back into the casing during high-current interruption.

Yet a further object of our invention is to provide an improved arc-extinguishing unit, in which a plurality of spaced venting passages are associated with the unit, in which one or more of said venting passages are valve controlled, and yet there exists at least one other venting passage which is not valve controlled. This brings about a desirable situation in which fluid is caused to effectively flow axially along the arc passage intimately engaging the arc and facilitating low-current interruption.

Still another object of our invention is to provide an improved arc-extinguishing unit in which preferably all of the venting passages are valve controlled.

An additional object is to provide an improved arc-extinguishing assemblage in which one or more of the arc-extinguishing units have their venting passages valve controlled, and yet one or more other arc-extinguishing units have their venting passages freely open.

An ancillary object of our invention is to provide an improved arc-extinguishing assemblage comprising a plurality of serially related arc-extinguishing units in which one or more of the units have valve control members which are more difficult to open than the valve control members associated with one or more other arc-extinguishing units.

An additional object of our invention is to provide a suitably configured flexible metallic valve control member, which may be cheaply manufactured, readily installed, not susceptible to breakage, and will yet retain its valve control characteristics throughout a long operational life of the interrupter.

A further object of our invention is to provide one or more arc-extinguishing structures having venting passages, in which valves are associated only with the venting passages on one side of the arc, whereas the venting passages on the other side of the arc are freely open. This gives rise to a desirable cross-blast action during relatively low-current interruption.

Still another object of our invention is to provide metallic valves in arc-extinguishing devices for control of fluid flow, in which the metallic valves are placed substantially along equi-potential surfaces, so that they produce the minimum amount of distortion on the potential gradient across the arc-extinguishing device.

Another object of our invention is generally to provide improved valve means associated with arc-extinguishing units to bring about desired fluid-flow conditions.

Further objects and advantages will readily become apparent upon reading the following specification, taken in conjunction with the drawings, in which.

Figure 1:
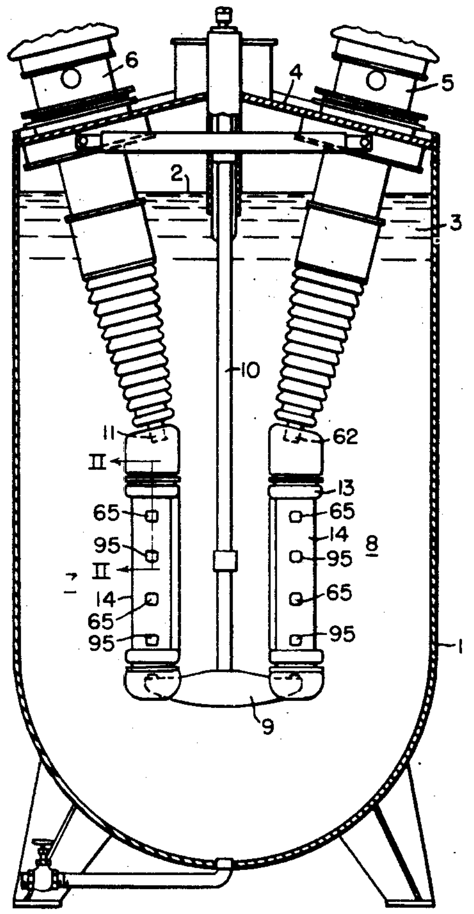
Figure 1 is a side elevational view, partially in vertical section, of one pole of a circuit interrupter embodying our invention, the contact structure being shown in the closed-circuit position.

Referring to the drawings, and more particularly to Fig. 1 thereof, the reference numeral 1 designates a tank filled to the level 2 with a suitable arc-extinguishing fluid 3, in this particular instance circuit breaker oil. Supported by the cover 4 of the tank 1 are a pair of terminal bushings 5, 6, to the lower interior ends of which depend interrupting assemblies, generally designated by the reference numerals 7, 8.

Electrically interconneting the interrupting assemblies 7, 8 is a conducting cross-bar 9, which is vertically actuated in a reciprocal manner by an insulating operating rod 10. The operating rod 10 may be actuated by any suitable mechanism, which forms no part of our invention. The interrupting assembly 7 is secured by a contact foot, not shown, which clamps in place to the lower end of the conductor stud 11, which passes interiorly through the left-hand terminal bushing 6 of Fig. 1.

Figure 2:
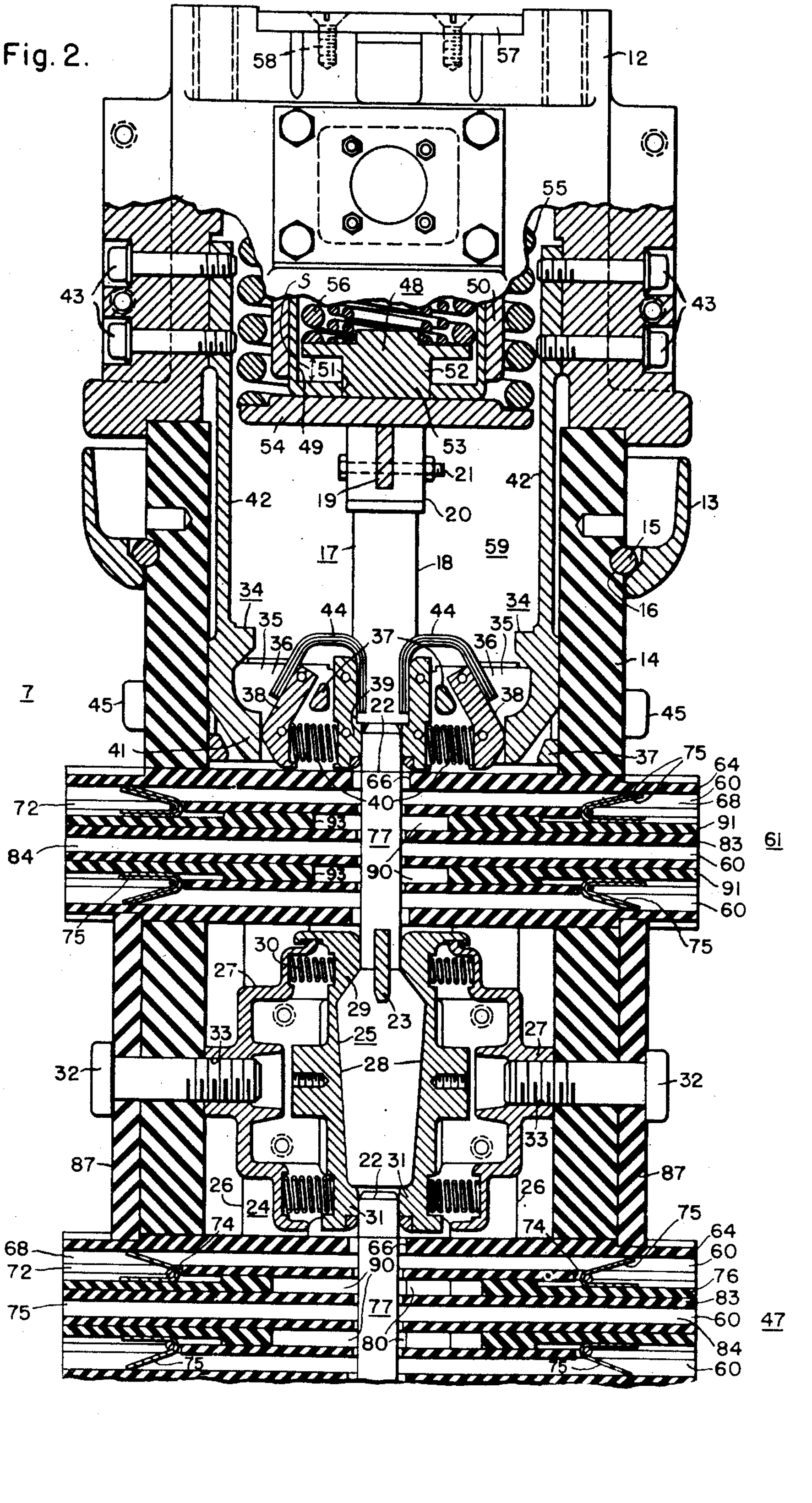
Fig. 2 is a substantialy fragmentary enlarged vertical sectional view through a modified type of arc-extinguishing assemblage, taken substantially along the line II—II of Fig. 1, looking in the direction of the arrows, with the contact structure being shown in the closed-circuit position.

The contact foot, not shown, is secured by bolts to the top casting 12 of the assemblage 7, which is more clearly shown in Fig. 2. The casting 12, in turn, is secured by a plurality of bolts to an annular clamping flange 13 (Fig. 2). The clamping flange 13 is rigidly secured to the upper end of a casing 14 by means of a clamping ring 15, which is inserted within an annular groove 16 provided adjacent the upper end of the casing 14, as shown in Fig. 2.

Movable interiorly within the casing 14 of the interrupting assemblage 7 is a movable contact assembly, generally designated by the reference numeral 17. The details of the movable contact assembly 17, as well as other details to which reference is only briefly made herein, are shown and illustrated in particular, and claimed, in U. S. Patent application entitled "Circuit Interrupters," Serial No. 401,239, filed December 30, 1953, by Robert E. Friedrich, and assigned to the assignee of the instant application.

Although several features of our invention are applied herein to a circuit interrupter of the type set out in the aforesaid Friedrich application, which is particularly adapted for the interruption of a wide range of currents at extremely high speed for voltages up to 330 kv., nevertheless these features may readily be adapted by those skilled in the art to other circuit interrupters of different amperage and voltage ranges. For a complete description of the several parts of the interrupter, reference is made to the aforsaid Friedrich application, and only the parts thereof which particularly bear upon an application of the present invention are described herein.

Briefly, the movable contact assembly 17 comprises a pair of insulating operating rods 18, to the upper ends of which is bolted a saddle assembly 19. The saddle assembly 19 comprises a metallic cross-member having sleeves 20 integrally formed at its outer ends. The sleeves 20 are apertured and accommodate bolts 21, which rigidly secure the upper ends of the operating rods 18 to the saddle brace 19.

Spaced axially along the length of the operating rods 18 are a plurality of movable contacts 22, which preferably are provided by suitable castings having cross-pieces 23, the ends of which are bifurcated to straddle the operating rods 18, and clamped thereto.

Disposed interiorly within the casing 14 of the interrupting assemblage 7 is a pair of ladder-like relatively stationary intermediate contact assemblages, generally designated by the reference numeral 24 in Fig. 2 of the drawings. With particular reference to Fig. 2, it will be noted that the relatively stationary bridging contact assemblage 24 comprises a plurality of relatively stationary bridging contacts 25, which are spaced along two insulating bars 26. The bridging contacts 25, as shown in Fig. 2, comprise a support bracket 27 and an intermediate bridging contact 28. As shown in Fig. 2, the bridging contact 28 of one intermediate contact assemblage 24 cooperates with the bridging contact 28 of the oppositely disposed intermediate contact assemblage 24.

As observed in Fig. 2, the upper contact portion 29 is resiliently biased inwardly by a contact compression spring 30. This provides a flexible contact bearing action upon the side of the movable contact 22. The lower end 31 of each intermediate bridging contact 28 cooperates with the immediately adjacent lower movable contact 22 to establish an arc. Arcing occurs only at the lower end of each bridging contact 25 and not at the upper end thereof, where merely a sliding contacting action takes place.

It will be obvious from the foregoing discussion that, in effect, each intermediate bridging contact 28 conducts the current from the upper movable contact 22 to the immediately adjacent lower movable contact 22 as indicated in Fig. 2 of the drawings. Insulating bolts 32 extend through the side walls of the casing 14 and thread into tapped apertures 33 provided in the support brackets 27.

Disposed at the upper end of each ladder-like intermediate bridging contact assemblage 24 is a contact guide support 34. The contact guide support 34 includes a box-like casting 35 having side walls 36, which are interconnected by a pair of braces 37 integrally formed with the box-like casting 35. The contact guide support 34 supports a pair of finger contacts 38, 39, which are biased apart by a single spring 40, as shown in Fig. 2. The contact finger, or relatively stationary disconnecting contact 38, engages the lower end 41 of a contact extension, or relatively stationary disconnecting contact 42, the upper end of which is secured by a plurality of bolts 43 to the top casing 12 of the assemblage 7. The inner contact finger 39 bears against the upper end of the top movable contact 22, and cooperates therewith to establish an arc during the opening operation. A flexible strap 44, comprised of thin laminations of copper strap, is riveted to the contact fingers 38, 39 and electrically interconnects them.

The box-like casting 35 has a pair of tapped mounting apertures not shown, which accommodate mounting bolts 45, which pass through the side walls of the casing 14. Vertical reciprocal movement of the movable contact assembly 17 is in part guided by the bridging contacts 25, which will be apparent from an inspection of Fig. 2.

Disposed at the upper end of the interrupting assemblage 7 is a piston means, generally designated by the reference numeral 48, and including a piston 49 which is guided by a downwardly extending cylindrical portion 50 of the casting 12. The piston 49 has an aperture 51, to accommodate an extension 52 of a spring seat 53. The lower end of the extension 52 bears against a circular spring plate 54, which is picked up by the saddle assembly 19 of the movable contact assemblage 17 during the closing operation. The spring plate 54 is biased downwardly by an accelerating compression spring 55, as shown in Fig. 2. Consequently, the accelerating spring 55 not only biases the spring plate 54 downwardly, but also the movable contact assemblage 17 as well. The spring seat 53 is biased downwardly by a battery of compression springs 56, which seat at their upper ends against a plate 57, which is secured by screws 58 to the top casting 12. The details of the piston means 48 are more fully set out in the aforesaid Friedrich application.

The accelerating spring 55 acts independently of the battery of compression springs 56 during the existence of high arcing pressure within the region 59 within the casing 14. In other words, the accelerating spring 55 will cause downward opening movement of the movable contact assemblage 17, and hence opening movement of the contacts 22, even though the arcing pressure within the region 59 stalls the piston 49 and prevents it from moving downwardly. It is only during the existence of relatively low arcing pressure within the region 59 within the casing 14 that the battery of compression springs 56 is effective to move the spring seat 53 downwardly, and hence carrying the piston 49 therewith following a predetermined time delay, as afforded by the distance "S" in Fig. 2. In other words, the piston 49 is not picked up by the spring seat 53 until the spring seat 53 has traversed the distance "S." As a result, there is a predetermined time delay before actuation of the piston means 48, the energy provided by extension of the battery of springs 56 during this time delay being utilized for initial acceleration of the movable contact assemblage 17.

As will be brought out more clearly hereinafter, during the existence of high arcing pressure within the region 59, during heavy load current interruption, or during the interruption of heavy overload currents, the piston means 48 will be ineffective. Following a subsidence of the pressure within the region 59, the piston means 48 will then become effective to provide a flushing flow of clean liquid out through the vents 60 associated with the arc-extinguishing units, or arc-rupturing structures 47, 61, more fully explained hereinafter. During the interruption of relatively low-amperage currents, where there is little arcing pressure, the piston means 48 will be effective at this time, to send liquid flow into the several arcs and out through the vents 60 associated with the interrupting units 47, 61.

With the construction, as shown in Fig. 2, the piston 49 is not picked up until at approximately the same time that the movable contacts 22 establish arcing with the lower ends of the bridging contacts 28. By varying the distance "S," it would be possible to provide a liquid flow prior to the establishment of arcing, or, should it be desirable, the distance "S" could be increased to provide a predetermined time delay before application of the piston 49, at which time the arcs would have a predetermined length.

The electrical circuit through the interrupter will now be described. The circuit includes the terminal stud 11 extending interiorly through the terminal bushing 6, the contact foot (not shown), upper casting 12, contact extension 42, and through the contacting portion 41 thereof to contact finger 38. The circuit then extends through the shunt 44 to the contact finger 39, thence through the upper movable contact 22 and through the upper intermediate bridging contact 25 to the middle movable contact 22. The circuit extends through the next lowermost intermediate contact 25 to the bottom movable contact 22, thence through a contact extension, not shown, to the conducting cross-bar 9 of Fig. 1. The circuit extends through the right-hand interrupting assemblage 8 in a similar manner through right-hand terminal stud 62 of the terminal bushing 5.

During the opening operation, suitable means, either responsive to the passage of overload currents passing through the interrupter, or in response to the wishes of a station attendant, operates to cause downward opening motion of the insulating operating rod 10. This carries the cross-bar 9 downwardly permitting the accelerating compression spring 55 to move the spring plate 54 downwardly carrying with it the movable contact assembly 17. This causes an arc to be established between the upper movable contact 22 and the contact finger 39 of the contact guide support 34. Simultaneously with this arc establishment, there also occurs arc establishment between each of the lower movable contacts 22 and the lower end 31 of each intermediate contact 25.

To assist in arc interruption there is provided a plurality, in this instance four, arc-extinguishing units or arc-rupturing structures 47, 61, in Fig. 2. These arc-extinguishing units 47, 61 are of substantially block-shape, as indicated in Figs. 2–5, 8, 9, 15 and Fig. 20. Preferably each of the arc-extinguishing structures includes a plurality of suitably configured insulating fiber plates cemented together and having dowel pins 63 of fiber passing therethrough. The cemented construction holds the plates in position, making a stronger construction, a more convenient assemblage to handle during inspection, and also prevents fluid leaking between the plates.

Multi-break, multi-flow interrupters have been built and tested for circuit breakers with voltage ratings as high as 330 kv. Figs. 1 and 2 show a four-break assembly. Fiber interrupter blocks 47, 61, of Fig. 2, made of fiber plates cemented together, are mounted transversely to the main insulating tube 14. These interrupting blocks, or arc-extinguishing units 47, 61, provide inlet oil flow channels from the oil driving piston 49 to each break, and also vent passages or vent channels out each end of the units 47, 61.

Interrupting tests have shown that fixed dimensions of the vents 60 of the interrupting units 47, 61 must be a compromise between the restricted openings best suited to interruption of low currents, around 100 amperes as for transmission line charging current, and the wide open venting required to keep internal tube pressures within reason when interrupting the heaviest short circuit currents, of 50,000 amperes, and more.

One aspect of our invention includes means for providing selective vent control so that the most favorable operating conditions can be obtained at both high and low currents. As will be brought out more fully hereinafter, these vent control means may be made of either fiber items or metallic members, depending upon the application requirements.

Figure 3:
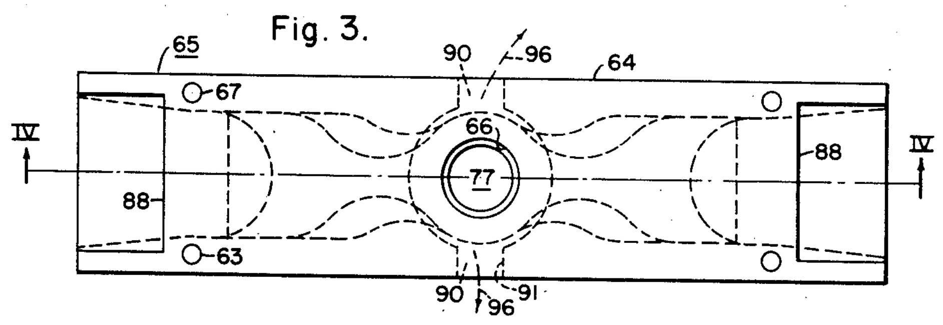
Fig. 3 is a top plan view of a modified type of arc-extinguishing unit which may be substituted for the two units shown in Fig. 2.

Considering a representative arc-extinguishing unit 47, shown as the second unit in Fig. 2, it will be observed that the top insulating plate 64 preferably has a configuration more fully shown by the full lines of Fig. 3. Although Fig. 3 shows a modified type of arc-extinguishing unit 65, nevertheless the top and bottom plates in both extinguishing units 47 and 65 are identical. It will be observed that the top plate 64 has a centrally disposed aperture 66 provided therein to accommodate longitudinal motion of the movable contact 22. Also the top plate 64 has a plurality of openings 67 for the accommodation of the fiber dowel pins 63, hereinbefore referred to.

Figure 11:
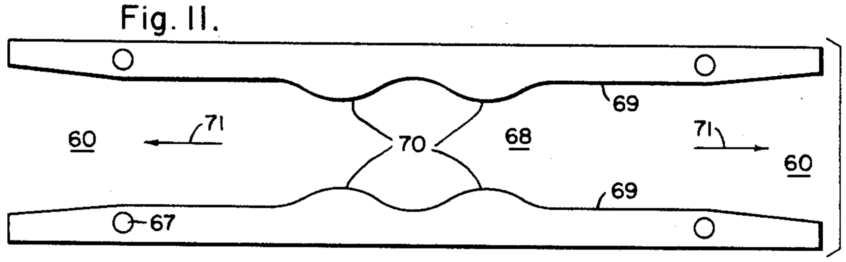

Immediately below the top insulating plate 64 of the unit 47 of Fig. 2 is an insulating vent plate 68 more clearly shown in Fig. 11 of the drawings. As shown, the vent plates 68 comprise two laterally spaced insulating strips 69 each having two widened portions 70 to somewhat retain the pressure within the unit 47 and affording a slight restriction to outward venting, as indicated by the arrows 71.

Figure 6:
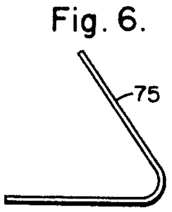
Fig. 6 is an end elevational view of the substantially U-shaped metallic spring valve member, which may be used in certain modifications of our invention.
Figure 7:
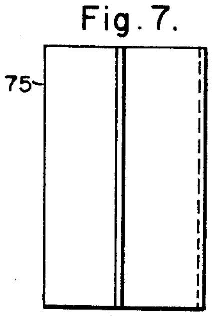
Fig. 7 is a top plan view of the metallic spring member shown in Fig. 6.

Immediately below the insulating vent plate 68 is an insulating orifice plate 72 more clearly shown in Fig. 13 of the drawings. The orifice plate 72 has a centrally disposed aperture 73, which is slightly smaller in diameter than the orifice 66 of the top orifice plate 64 of the unit 47. Also the orifice plate 72 has the ends thereof notched, as at 74, to accommodate a substantially U-shaped metallic spring valve member 75, more particularly shown in Figs. 6 and 7 of the drawings, and in this particular instance, preferably made of 0.020 inch stainless steel. As more fully explained hereinafter the use of such a metallic strip, bent to the configuration shown in Figs. 6 and 7 provides a variable vent opening, which is responsive to the internal pressure present within the unit 47. Actually one or more of such metallic spring valves 75 may be employed together, depending upon the desired force to effect opening. That is, as more fully explained hereinafter, it may be desirable to provide certain grid blocks with valves which will open with more difficulty than the valve members of other grid blocks. The top unit 61 of Fig. 2 shows this situation, where two superimposed metallic valve members 75 are employed to result in a valve member which will require a greater pressure within this first unit 61 to bring about its opening than in the case of the single valve 75 in the second unit 47.

Figure 13:
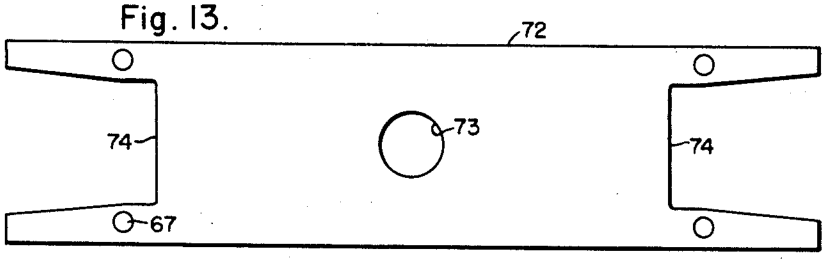

As more clearly shown in Fig. 2, the length of the metallic spring member 75 is fitted within the notched opening 74 of the insulating orifice plate 72 of Fig. 13. As before, dowel openings 67 may be provided.

Figure 17:
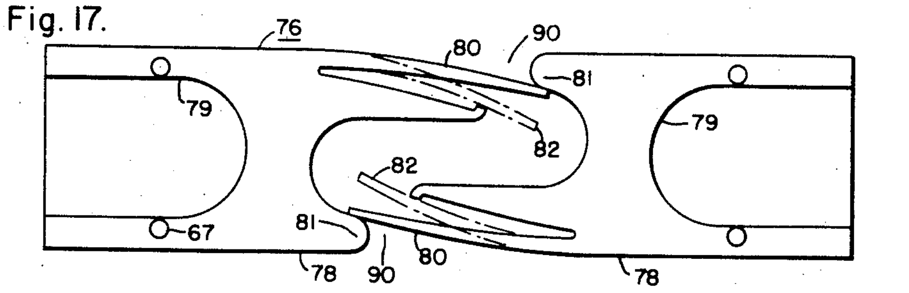

The next plate in the stack comprising the extinguishing unit 47 is designated by the reference numeral 76, and is more fully shown in Fig. 17 of the drawings. This plate may be termed an insulating inlet plate since it affords openings 90 from the region 59 interiorly of the casing 14 to the arcing passage 77 within the unit 47, the arcing pasage 77 being defined by the several openings 66, 73 of the several plates, and along which the movable contact 22 travels.

Referring to Fig. 17, it will be observed that the inlet plate 76 comprises two separate plate portions 78, each having a shallow recess 79 provided therein to accommodate one side of the spring valve members 75, as shown in Fig. 2. In addition, each plate portion 78 has a valve strip 80 formed therewithin, which is flexible due to the inherent flexibility of the fiber plate. The valve strips 80 in their at-rest position abut against a valve seat portion 81 of the immediately adjacently disposed plate portion 78, and when opened, due to the pressure exerted by the piston 49, will move to the position indicated by the dotted lines 82 of Fig. 17. The purpose for the valve strips 80 will be more fully explained hereinafter.

Figure 10:
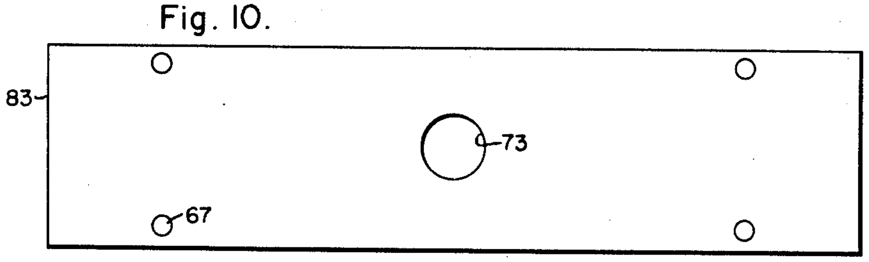
Figs. 10–14 are plate details which may be utilized in the arc-extinguishing units illustrated in Fig. 2.

Immediately below the insulating inlet plate 76 is an insulating orifice plate 83 more clearly shown in Fig. 10 of the drawings. The insulating orifice plate 83, is made of fiber, as are the other plates, and includes a centrally disposed aperture 73, which may be of the same diameter as the orifice 73 of the orifice plate 72 of Fig. 13. Dowel openings 67 are also provided.

Figure 12:
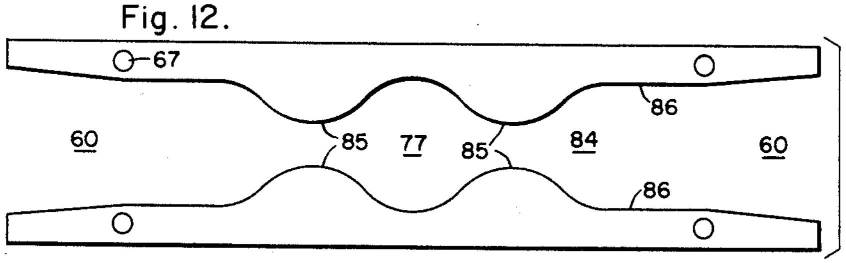

The next plate to be considered in the construction of the extinguishing unit 47 is herein termed a vent plate, and is designated by the reference character 84, being shown more clearly in Fig. 12 of the drawings. It will be noted that the vent plate 84 is somewhat similar to the vent plate 68 of Fig. 11, but has restricting portions 85 associated with each of the insulating strips 86, which collectively comprise the vent plate 84. The restrictions 85 are used in place of a valve to assist in holding the pressure within the arcing passage 77 during arc interruption, and yet provide free circulation of oil for cooling the contacts when carrying current in the closed position.

Figure 5:
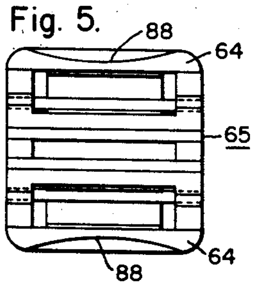
Fig. 5 is an end elevational view of the extinguishing unit illustrated in Figs. 3 and 4.

The plates below the central vent plate 84 are identical, or a mirror image, to those previously described, and are placed in the manner indicated in Fig. 2, whereby the grid block 47 as a whole may be removed and reversed, being turned axially 180° so that a fresh set of orifices 66, 73 are provided. As shown in Fig. 2, insulating locking bars 87 are maintained in position by the mounting bolts 32. The ends of the locking bars 87 are arcuately shaped, and may be rotated within the notched portions 88 of the top and bottom insulating plates 64, as indicated in Fig. 5. Thus, by merely loosening the bolts 32, the locking bars 87 may be slightly rotated toward a horizontal position permitting removal of the insulating blocks 47. Upon their removal for inspection, they may be reinserted in the same or in an inverted condition, whereupon the locking bars 87 may be again rotated to their vertical position, as shown in Fig. 2, in which position the mounting bolts 32 may again be tightened.

Leaving free the central vent opening 60 afforded by the vent plate 84, by utilizing spring valve members 75 at only four of the six vent openings 60, as shown in grid blocks 47, 61 in Fig. 2 has another advantage besides improving ventilation. During low current interruption, fluid flow is caused by the piston action, and the valves 75 remain closed or open only partially. This has the desirable advantage that the oil and gas is restricted in its passage out of the units 47, 61 at the upper and lower valve-controlled vent openings 60, and is compelled to pass vertically along the vertical arcing passage 77 to be exhausted out at the central freely opened venting passages 60 of vent plate 84. Low current interruption has been found to be enhanced by such a construction. In addition, dielectric conditions are improved by the omission of the central metallic valve member 75, thereby keeping the top and bottom valve members farther apart. As shown in Fig. 12, as compared with Fig. 11, the middle vents 60 of vent plate 84 are more restricted in venting area by the widened portions 85, compared with widened portions 70 of Fig. 11, to compensate for the omission of valve action. An additional advantage is that replacement of fresh fluid along arcing passage 77 in the closed position of the interrupter is facilitated by leaving the central vents 60 open.

Figure 14:
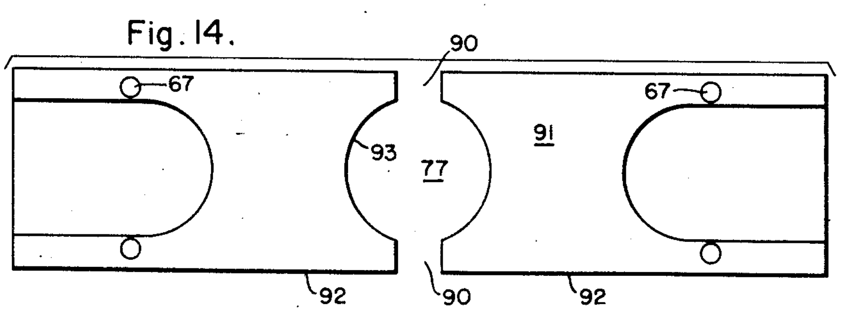

The top and third arc-extinguishing units 61 of Fig. 2 are the same in plate structure with the second and fourth units 47 with the exception that freely open inlet plates 91, shown in detail in Fig. 14, are used instead of the valve-controlled inlet plates 76 of Fig. 17. There is thereby provided free communication at all times between the arcing passage 77 of units 61 of Fig. 2 and the region 59 within the casing 14.

Figure 8:
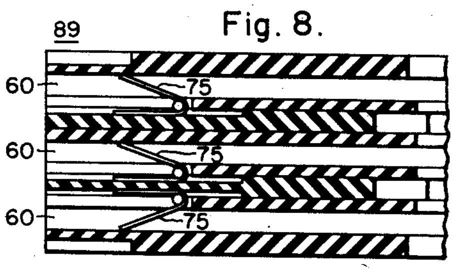
Fig. 8 is a fragmentary vertical sectional view through a modified type of arc-extinguishing unit, in which valve control members are utilized in all of the venting passages.

Although this venting valve construction is deemed desirable, nevertheless for certain applications and under somewhat different conditions, it might be desirable to utilize the metallic spring members 75 in each of the venting passages 60, as indicated in the modified extinguishing unit 89 of Fig. 8.

A particularly desirable construction is to have the top and third units 61 with heavy valve members 75, which may be obtained by superimposing two metallic valve strips 75 together, and having the second and fourth interrupting units 47 with relatively weak valve members 75, which could be obtained by using only a single valve member 75 in the top and bottom venting passages 60. The unequal pressure conditions tend to force additional oil flow toward the second and fourth units 47, supplementing the flow from the piston when interrupting currents of intermediate value. This construction is shown in Fig. 2 where reverse flow through the freely open inlet channels 90 of inlet plates 91 of units 61 is permitted.

The use of unequal valve strength in the units 47, 61 is particularly valuable during the interruption of intermediate value currents where the internal pressure causes the piston action to fall off, thereby reducing the piston flow into the units 47. Here, because of the strong springs 75 in units 61, the latter serve somewhat as pressure-generating centers, causing the aforesaid reverse flow back through the open inlet channels into the region 59 within casing 14 and through the valve controlled inlet channels 90 of units 47 to assist such intermediate current interruption.

Figure 4:
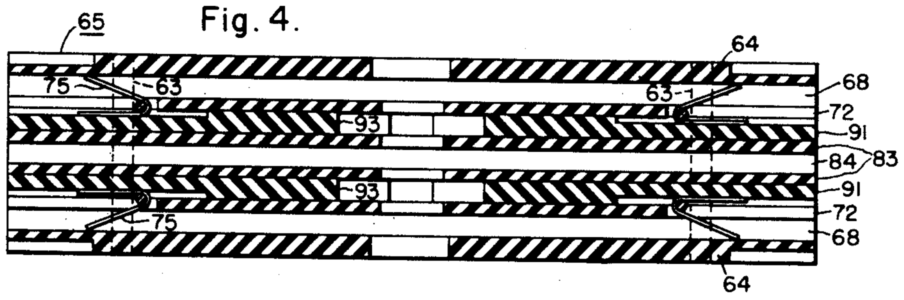
Fig. 4 is a vertical sectional view taken substantially along the line IV—IV of Fig. 3.

Figs. 3–5 illustrate a modified type of arc-extinguishing unit 65, in which inlet channels 90 are provided which permit free communication at all times between the arcing passage 77 and the region 59 within the casing 14 and relatively weak valves 75 are employed. The only difference between the extinguishing unit 65 of Figs. 3–5 and the upper extinguishing unit 61 of Fig. 2 is in the weak valve construction of unit 65. In the extinguishing unit 65 illustrated in Figs. 3–5, open inlet plates 91, as shown in Fig. 14, are employed as were used in units 61 of Fig. 2. As illustrated in Fig. 14, the open inlet plate 91 comprises a pair of laterally spaced plate portions 92 having open inlet channels 90 provided therebetween and leading into a recess portion 93, which cooperates with the orifice plates 72 of Fig. 13 and 83 of Fig. 10 to form the recesses or pockets 93, which retain additional fluid adjacent the arc.

Figure 9:
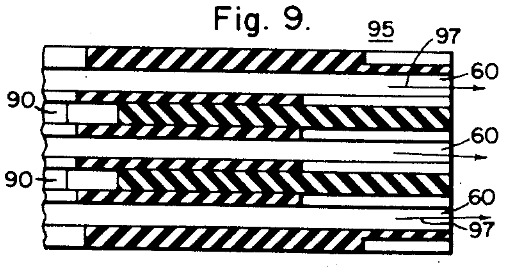
Fig. 9 is a fragmentary vertical sectional view through still another modified type of extinguishing unit, in which all of the venting passages are open at all times.

Fig. 9 indicates still another modified type of extinguishing unit, generally designated by the reference numeral 95, in which the construction is identical to that of the unit 65 of Figs. 3–5 with the exception that the valve members 75 are omitted. In other words, the extinguishing unit 95 of Fig. 9 has its venting passages 60 freely open at all times and the inlet channels 90 are also freely open.

This unit is not used by itself alone but is associated with the valved extinguishing unit 65 of Figs. 3–5. This construction is indicated in Fig. 1, where the top and third units are of the valved extinguishing unit type, as designated by the reference numeral 65, the construction being illustrated in Figs. 3–5, whereas the second and fourth extinguishing units are of the open type as designated by the reference numeral 95, the construction being that set out in Fig. 9 of the drawings. This has the advantage that during the interruption of currents in an intermediate range where the piston is not sufficiently effective, the valved units 65 of each assemblage 7, 8 serve as pressure-generating sources to send the fluid in a reversed direction out of the grids 65, as indicated by the arrows 96 of Fig. 3, through the region 59 within the casing 14, and inwardly through the open inlet channels 90 of the relatively open extinguishing units 95. These extinguishing units 95 will serve as interrupting centers, where the oil may be freely passed out of the units 95 in the direction indicated by the arrows 97 of Fig. 9.

Thus Fig. 1 illustrates a particular construction in which one or more relatively open grid blocks 95 are utilized in conjunction with one or more valved grid blocks 65, both having freely open inlet channels 90.

Test results have shown that when the valve members 75 are placed in the vents 60 there is maintained an elevated pressure within the interrupting units during low-current interruption, whereas during high current interruption the valve member 75 may freely open to permit the free passage of gas and oil thereout of during such high-current interruption. Tests have also indicated that by this means of controlling the pressure within the grids, improved performance is obtained at low values of current without effecting the operation at high values of currents. The use of metallic members 75, for particular applications, has the advantage over the use of fibrous or insulating material for the valves in that the latter may, for particular applications, be too weak or too fragile. The valve member 75 of spring steel, located near the exit end of the vents 60 are dimensioned so that they lay generally in equipotential planes and subtend very little of the voltage applied to the general structure. A structure utilizing the metallic valve members 75 has been given both high and low current interrupting tests with satisfactory results. These structures have been subjected to high voltage, 60 cycle hold tests to 600,000 volts, and impulse tests to over 2,000,000 kv. with a wave front in excess of 1,500,000 volts per microsecond.

As indicated in Figs. 2 and 3–5 and Fig. 15, for certain applications the valves should preferably be placed in only four of the six vents per grid. It has been observed that at low currents, improved performance has been obtained by generally restricting the escape of oil and gas at certain elevations, forcing it to move in a vertical plane along the arc and through restricting passages, and then escape freely to the outside through the central unvalved vents 60. In addition, the unvalved vents 60 permit some circulation of oil to enhance cooling when the breaker is standing in the closed-circuit position, and, as mentioned, improve dielectric conditions, when metallic valves 75 are used.

In the construction as set out in Fig. 1 using the open grid blocks 95 of Fig. 9 in conjunction with the valved grid blocks 65 of Figs. 3–5 it has been found that gas and oil cannot escape from the valved grids 65 when interrupting low values of current, with the result that these valved grids 65 form pressure-generating arcs to produce oil and gas flow through the vented grids 95 of Fig. 9, as previously mentioned. This action is independent of contact motion, and is therefore sustained until a current zero occurs, at which interruption takes place.

Somewhat the same action takes place during low and intermediate current interruption when, in the construction of Fig. 2, heavier spring members 75 are utilized at the top and third grid units 61, whereas relatively weak spring members 75 are employed in the second and fourth grid units 47.

When interrupting high currents, the arc pressure may exceed that provided by the oil piston 49, and as a result expansion of gas back in the inlet channels 90 may take place forcing the piston 49 up to the overtravel position. This back flow interferes with the best deionizing action which requires that oil be kept as close as possible to the arcing region. Our invention also covers check valves to prevent or block this reverse oil flow.

Figure 15:
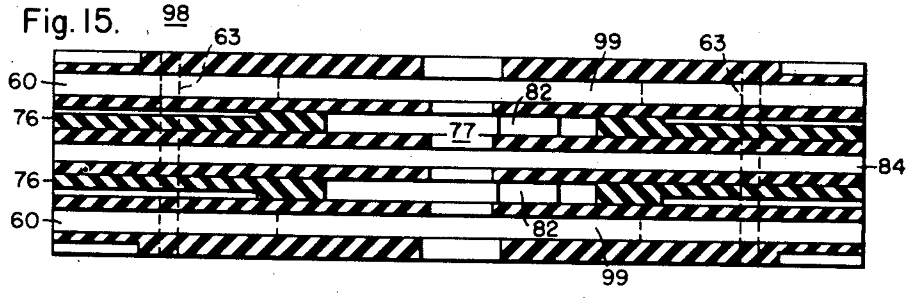
Fig. 15 is a vertical sectional view through a modified type of arc-extinguishing unit which may be substituted for the units shown in Fig. 2.

Referring to Fig.15, it will be noticed that a modified type of extinguishing unit 98 is shown, where in place of the metallic spring members 75 modified valved venting plates 99 are utilized. The valved venting plates 99 comprise venting strips 100, each of which has a valve portion 101 formed therein so that in the normal position the valve parts 101 cooperate to close the venting passages 60. During the existence of high pressure within the arcing passage 77 the valve strips 101 will be moved to the dotted position 102 to open up the vents 60. The inherent resiliency of the fiber plate is relied upon for this spring action. These valved venting plates 99 are utilized in the top and bottom venting pasages 60 of the modified extinguishing unit 98.

In addition, to prevent the foregoing reversed flow action out of the grid through the inlet channels 90 to cause reverse travel of the piston 49, the inlet valve plates 76 are provided, as indicated. These will function to cause closing of the inlet channels 90 during the interruption of high-valve currents, when otherwise the gas and liquid would pass out of the unit into the region 59 within the casing 14 to cause upward reversed travel of the piston 49. The units 47 of Fig. 2 were also equipped with the valves 80 in the inlet channels to prevent such reverse flow.

Figure 16:
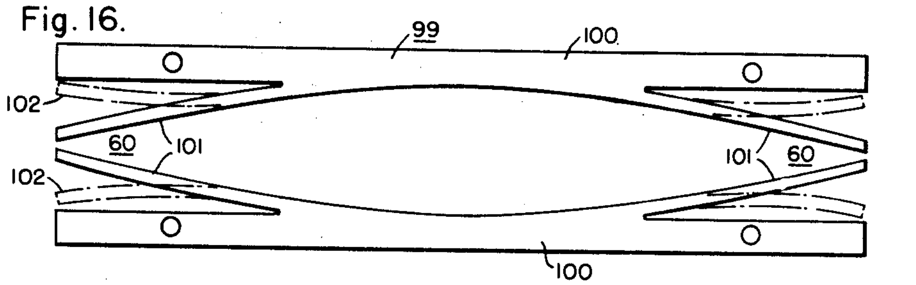
Figs. 16 and 17 are plate detail members which are utilized in the construction of the modified arc-extinguishing unit shown in Fig. 15.
Figure 18:
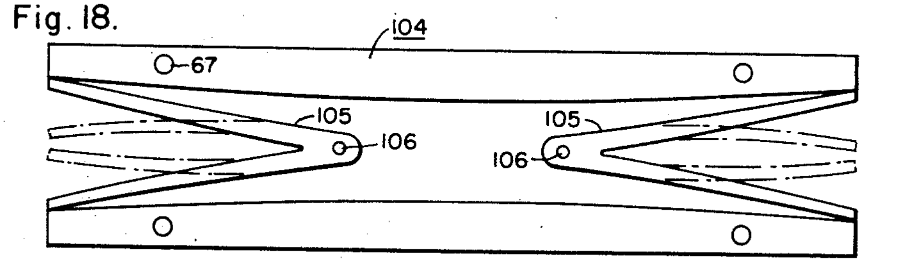
Fig. 18 is a modified vent valve plate detail, which may be substituted for the valve plate detail of Fig. 16 in the extinguishing unit of Fig. 14 when desired.

For particular applications, instead of using the insulating valved venting plates 99 of Fig. 16, it may be desirable to utilize in place thereof a modified valved venting plate 104 as shown in Fig. 18, in which a pair of insulating forked fiber valve items 105 are employed, maintained in position by fiber or insulating pins 106. These insulating valves 105 have been experimentally tested and have found to be satisfactory, the inherent resiliency of the fiber being relied upon for the desired valve action. It will be obvious that the insulating valve construction of Figs. 16 and 18 could be used in place of the metallic valve members 75 of Figs. 6 and 7.

Figure 19:
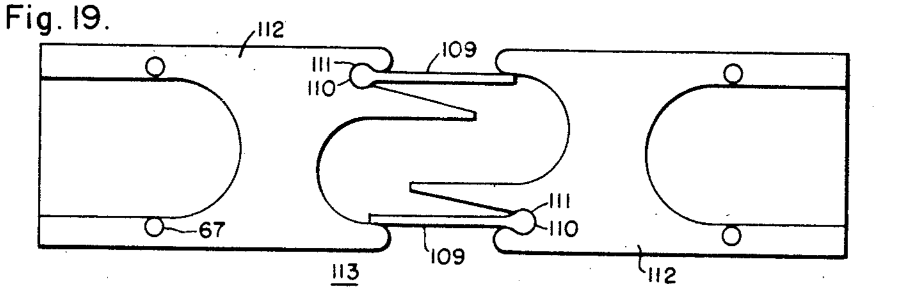
Fig. 19 is an inlet valve control plate detail which may be substituted for the inlet valve control plate detail of Fig. 17 in the lower extinguishing units of Fig. 2 and the extinguishing unit of Fig. 15 when desired.

Fig. 19 illustrated a further valved inlet plate construction in which insulating items 109 serve as valves. These items may be of metal, or of insulation, although insulation is preferred so that the possibility of breakdown along the extinguishing unit may be avoided. The valve items 109 have enlarged bases 110, as shown, which fit into enlarged recesses 111 provided in the inlet plate portions 112. The resulting valved inlet plate 113 may be utilized in place of the valved inlet plate 76 of Fig. 17, both such constructions preventing reverse travel of oil and gas out of the inlet channels 90 into the main casing 14 during high current interruption. During low current interruption, of course, the piston 49 is sufficiently strong to cause opening of the valve items 80, 109 to permit the inward travel of liquid into the units to effect arc extinction.

Figure 20:
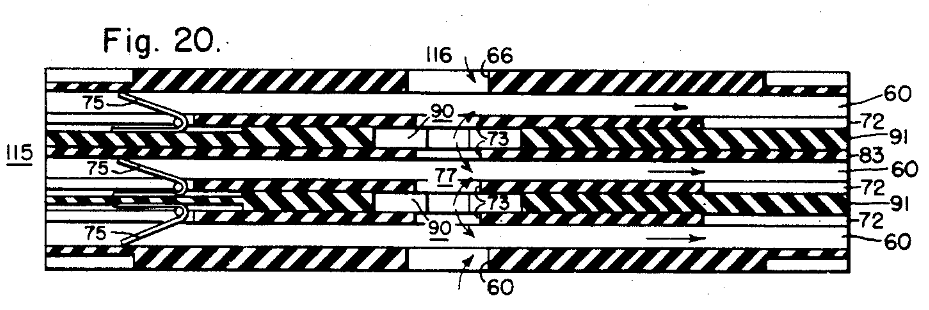
Fig. 20 illustrates a modified type of arc-extinguishing unit.

Fig. 20 shows a vertical sectional view through a modified type of arc-extinguishing unit, generally designated by the reference numeral 115, in which cross-blast action may be achieved on low and intermediate currents by positioning valve members 75 only on one side of the established arc, leaving the venting passages 60 on the other side freely vented. Thus fluid, such as oil, passing inwardly through inlet channels 90 of freely-open inlet plates 91 may strike the established arc 116 forcing it toward the right, as indicated in Fig. 20, against the now "splitter" portions 66, 73. Cross-blast action is thereby achieved during such low and intermediate current interruption. For certain applications the use of such modified units 115 may be desirable.

From the foregoing description of various features of our invention it will be apparent that we have provided an improved circuit interrupter particularly adapted for interrupting a wide range of currents. The extinguishing units are pressure responsive in that the valve members 75, 101 and 105 will open under high-pressure conditions to provide relatively free venting during high-current interruption. This limits the internal pressure which may be attained within the units.

We have shown how the valves 80, 109 may be employed to prevent reverse flow of liquid and gas out of the units into the interior 59 of the casing 14 to cause reverse travel of the piston 49. The invention has also been concerned with providing valve members 75 in all of the vents, or the insulating valve items 101, 105 could be placed in all of the vents if desired, as indicated in Fig. 8. As mentioned, during relatively low current interruption a freely open central vent 60 is desirable for certain applications to provide desired vertical flow of liquid along the arcing passage 77.

In addition, we have shown how valved grids may be employed as pressure-generating centers when utilized in conjunction with relatively open extinguishing units of the type indicated in 95 of Fig. 9. It will be obvious that certain features of the invention may be interchanged, that is the valved venting plates 99, 104 could be utilized in place of the metallic valves 75 and the inlet valve plates 76, 113 interchanged. The metallic valves 75 are placed in the vents 60 of the grids in such a way that they maintain pressure inside the grids during light-current interruption and allow free venting during high-current interruptions. The metallic valves are located substantially in equipotential planes and subtend very little of the voltage applied to the interrupter. The valves 75 may be used in one or more of the vents of the grid to force the oil along the arc and through restrictions to enhance interruption of low values of current. As mentioned, pressure valves 75 may be used in one or more grids of a multigrid interrupter to act as pressure breaks for the more freely vented grids as shown in Fig. 1. Finally, pressure valves of unequal strength may be placed in the units to control the pressure and flow of oil and gas between the units when interrupting intermediate currents, as indicated in Fig. 2.

Although we have shown and described specific structures, it is to be clearly understood that the same were merely for the purpose of illustration, and that changes and modifications may readily be made therein by those skilled in the art without departing from the spirit and scope of the invention.

We claim as our invention:

1. A circuit interrupter including means for establishing an arc, an arc-extinguishing unit including one or more venting passages to extinguish the arc, a resilient metallic valve formed of inherently resilient material associated with each of one or more of said venting passages to retain the pressure within the unit to facilitate low-current interruption, and the pressure within said arc-extinguishing unit during relatively high-current interruption causing the opening of each of said resilient valves by a flexing of the resilient material thereof.

2. A circuit interrupter including contact means for establishing an arc, an arc-extinguishing unit including a plurality of spaced venting passages to extinguish the arc, each of said venting passages leading directly to the region externally of said arc-extinguishing unit, and a plurality of independently operable valves separate from the contact means and associated with a plurality of the venting passages, each valve functioning independently of the others, for the separate, individual control of the particular venting passage, the arrangement functioning to conserve the pressure within the unit to facilitate low current interruption.

3. The combination in a circuit interrupter of the fluid-blast type of an arc-extinguishing unit, means for establishing an arc adjacent the unit, said unit defining a plurality of spaced venting passages, and one or more substantially U-shaped resilient valve members formed of inherently resilient material associated with one or more venting passages to conserve the pressure within the unit to facilitate low current interruption.

4. A circuit interrupter including an arc-extinguishing unit, means for establishing an arc therein, one or more pairs of opposed venting passages associated with the unit, one or more insulating plates forming the side walls of opposed venting passages having cooperating valve fingers integrally formed of the insulating plate material to obtain the resiliency thereof, said valve fingers extending in substantially opposite directions, and the valve fingers separating more during high current interruption than during low current interruption to relieve the pressure within the unit.

5. A circuit interrupter including means for establishing an arc, an arc-extinguishing unit including a plurality of spaced venting passages to extinguish the arc, a plurality of independently operable valves associated with a plurality of the venting passages, each valve functioning independently of the others, for the separate, individual control of one particular venting passage, the arrangement functioning to conserve the pressure within the unit to facilitate low current interruption, each valve comprising an insulating forked member having diverging leg portions, means mounting each forked valve member at the junction of the leg portions thereof, and the pressure within said arc-extinguishing unit during relatively high current interruption causing the leg portions of each forked valve member to move toward each other to effect the opening of the valve member.

6. A circuit interrupter including an arc-extinguishing assemblage, said assemblage having an insulating casing and a plurality of separate spaced arc-extinguishing units having communication with the interior of the casing, means for establishing fluid pressure within the casing, each of the units having one or more venting passages leading to the region exteriorly of the casing, at least one of the units having one or more of the venting passages valve-controlled, and at least one of the remaining units having the one or more venting passages thereof relatively freely vented.

7. A circuit interrupter including an arc-extinguishing unit, an arc passage within the unit, means for establishing an arc along the arc passage, a plurality of laterally extending spaced venting passages leading laterally away from the arc passage, valve members formed of inherently resilient material in one or more of said venting passages separate from the arc-establishing means, and at least one of the venting passages being freely open at all times.

8. A circuit interrupter of the liquid-break type including a hollow casing, at least one arc-extinguishing unit supported transversely with respect to the casing by the side walls thereof, said arc-extinguishing unit having a plurality of oppositely disposed venting passages leading out of the casing laterally thereof, individual valve control members formed of inherently resilient material for a plurality of said venting passages, and one or more inlet passages leading from the interior of said supporting casing to the arcing region within said arc-extinguishing unit.

9. A circuit interrupter of the liquid-break type including a hollow casing, at least one arc-extinguishing unit supported transversely with respect to the casing, contact means for establishing an arc within said arc-extinguishing unit, said arc-extinguishing unit having a plurality of oppositely disposed venting passages leading out of the casing, and individual valve control members separate from the contact means for a plurality of said venting passages, and at least a pair of oppositely disposed venting passages associated with the arc-extinguishing unit being relatively freely vented.

10. A circuit interrupter of the liquid-break type including a hollow casing, piston means associated with the casing and operable to place the liquid disposed therein under pressure, one or more interrupting units extending across the casing and having oppositely disposed venting passages associated therewith, means defining an arc passage within the interrupting unit, means for establishing an arc within at least one of the interrupting units centrally thereof along said arc passage, one or more inlet passages provided by said one interrupting unit leading from the interior of the casing to the arc passage, and valve means disposed in the one or more inlet passages to prevent reverse flow from the arc passage to the interior of the casing.

11. A circuit interrupter of the liquid-break type including a hollow casing, piston means associated with the casing and operable to place the liquid disposed therein under pressure, one or more interrupting units including a plurality of insulating plates extending across the casing and having oppositely disposed venting passages associated therewith, means defining an arc passage within the interrupting unit, means for establishing an arc within at least one of the interrupting units centrally thereof along said arc passage, one or more inlet passages provided by said one interrupting unit leading from the interior of the casing to the arc passage, and valve means disposed in the one or more inlet passages to prevent reverse flow from the arc passage to the interior of the casing, said valve means including a flexible portion of one of said insulating plates.

12. The combination in a liquid-break circuit interrupter of a tubular insulating casing, one or more transversely disposed interrupting units supported by the casing, each of the interrupting units communicating with the interior of the tubular casing, at least one of the interrupting units having a plurality of oppositely disposed venting passages leading out the opposite ends of said one interrupting unit to the region exteriorly of the tubular casing, and one or more substantially U-shaped metallic spring valve members controlling the venting through one or more of the venting passages.

13. A circuit interrupter including an arc-extinguishing assemblage including a plurality of arc-extinguishing units, each arc-extinguishing unit having one or more venting passages, means for establishing a plurality of serially related arcs, one arc for each of a plurality of said units, resilient valve control members for each of a plurality of said units, and the valve members of one unit being more difficult to open than the valve control members of another unit.

14. A circuit interrupter including an arc-extinguishing unit, means for establishing an arc within the unit adjacent the central portion thereof, said unit having a pair of oppositely disposed venting passages leading out the ends of the unit, and valve means separate from the arc-establishing means disposed only adjacent one of the venting passages to provide cross-blast action.

15. A circuit interrupter including an arc-extinguishing unit, means for establishing an arc within the unit adjacent the central portion thereof, said unit having a plurality of venting passages leading out each end of the unit, and individual valve control members separate from the arc-establishing means and associated only with the plurality of venting passages on one side of the unit to provide cross-blast action at least during low current interruption.

16. A circuit interrupter including an arc-extinguishing unit having a plurality of opposed venting passages on different levels extending out of the opposite ends of said unit, contact means for establishing only one arc substantially transversely of said levels and adjacent the central portion of the unit, and one or more valve members separate from the contact means formed of an inherently resilient material controlling fluid flow from one or more venting passages.

17. A circuit interrupter including an arc-extinguishing unit having a plurality of opposed venting passages on different levels extending out of the opposite ends of said unit, contact means for establishing an arc substantially transversely of said levels and adjacent the central portion of the unit, and at least one valve member controlling the flow of fluid on only one side of a pair of opposed venting passages to obtain cross-blast action on the arc during low current interruption.

18. A circuit interrupter including an arc-extinguishing unit having a plurality of venting passages on different levels extending out of the opposite ends of said unit, contact means for establishing an arc substantially transversely of said levels and adjacent the central portion of the unit, and a plurality of valve members separate from the contact means and formed of an inherently resilient material controlling fluid flow from one or more venting passages.

19. The combination in a circuit interrupter of an arc-extinguishing unit having three or more levels of venting passage associated therewith leading out opposite ends of the unit, means for establishing an arc interiorly within the unit, the outside levels being individually valve-controlled and at least an inner level being freely vented on at least one end of the unit.

References Cited in the file of this patent

UNITED STATES PATENTS

| | | |
|---|---|---|
| 1,955,213 | Whitney et al. | Apr. 17, 1934 |
| 2,160,673 | Prince | May 30, 1939 |
| 2,196,008 | Cole | Apr. 2, 1940 |
| 2,668,891 | Driescher | Feb. 9, 1954 |
| 2,717,293 | Titus et al. | Sept. 6, 1955 |